United States Patent [19]

Dosser, III

[11] Patent Number: 4,787,512

[45] Date of Patent: Nov. 29, 1988

[54] MOUNTING HARDWARE FOR SAFE REAR SEAT EVELATION AND SEAT BELT EXTENSION IN FORD SUPER CAB TRUCKS

[75] Inventor: Charles M. Dosser, III, San Antonio, Tex.

[73] Assignee: Dosser Industries, Inc., Universal City, Tex.

[21] Appl. No.: 3,463

[22] Filed: Jan. 15, 1987

Related U.S. Application Data

[63] Continuation-in-part of Ser. No. 653,763, Sep. 24, 1984, abandoned.

[51] Int. Cl.⁴ .................. B65D 69/00; B60N 1/00; B60R 22/22
[52] U.S. Cl. ................... 206/223; 296/63; 297/468
[58] Field of Search ............... 206/216, 223; 296/63–65; 297/468

[56] References Cited

U.S. PATENT DOCUMENTS

| | | | |
|---|---|---|---|
| 2,714,417 | 8/1955 | Golding | 297/440 |
| 2,799,321 | 7/1957 | Liljengren et al. | 296/64 |
| 2,955,644 | 10/1960 | Kramer | 296/64 |
| 3,317,237 | 5/1967 | Kerby | 296/63 |
| 3,428,976 | 2/1969 | Robinson | 296/63 |
| 3,531,154 | 9/1970 | Fleche | 296/65 A |
| 3,848,736 | 11/1974 | Eshelman | 206/231 |
| 4,225,184 | 9/1980 | Strowick | 297/468 |

FOREIGN PATENT DOCUMENTS

| | | | |
|---|---|---|---|
| 1424828 | 12/1965 | France | 297/440 |
| 0669687 | 4/1952 | United Kingdom | 296/65 R |

Primary Examiner—Jimmy G. Foster

[57] ABSTRACT

Rear seat mounting hardware, consisting of sixteen brackets, two seat belt extensions and one seat latch that are easily assembled and, when installed in a Ford Super Cab, elevates the seat to a comfortable and safe riding position for passengers. It will eliminate the impracticability and discomfort inherent in existing mounting hardware and assembly for Ford Super Cabs. It will also provide dual cargo space, thus increasing storage capabilities. More importantly, it will provide safe rear seat elevation that complies with Federal motor vehicle safety standards and enhances passenger safety.

8 Claims, 2 Drawing Sheets

MOUNTING HARDWARE FOR SAFE REAR SEAT EVELATION AND SEAT BELT EXTENSION IN FORD SUPER CAB TRUCKS

REFERENCE TO RELATED APPLICATIONS

This is a continuation-in-part of my pending application Ser. No. 06/653,763, filed Sept. 24, 1984, now abandoned for "New and Improved Mounting Hardware For Safe Rear Seat Elevation & Seat Belt Extension In Ford Super Cab Trucks," assigned to applicant's assignee.

BACKGROUND OF INVENTION

Field of the Invention

This invention relates to seat mounting devices and seat belt extensions, more particularly to respective devices and extensions unique to the rear-seat of a Ford Super Cab Truck.

DESCRIPTION OF THE PRIOR ART

Although the concept of raising a vehicle seat using numerous brackets, bolts and braces is old and well known, numerous problems have arisen with respect to conventional seat mounting devices. Prior art, pertinent to applicants disclosure, include Kerby, Fleche, and British Pat. No. 669687. Kerby's open-view seating construction, although designed for elevation, is an example of derivative safety problems which would not comply with federal safety regulations. His design, although providing elevation, is not of the same mechanical design of this invention nor could it be adopted, in any form, for the Ford Super Cab Truck, Its single purpose of elevation is the only common denominator between 3, 317, 237 and this application. It does not address increased safety, comfort or dual cargo. The Fleche patent references a seat mounting device for a vehicle having elastically deformable members for absorbing the momentum of the occupant of the seat produced by a sudden acceleration or deceleration of the vehicle. Although the latter invention provides an energy absorbing seat mounting device, it does not address seat height or construction of mounting hardware for increased safety, comfort, or dual cargo. British Pat. No. 669, 687 provides for folding seats for motor cars, but is not common in design or purpose of this application.

To simply elevate a vehicle seat requires only minimal skill in the art to provide brackets, bolts and braces to achieve desired height. Desired height, however, will result in serious problems without the unique design of safety tested materials. The design, consisting of assembly components, are interconnected to one another in a novel arrangement to elevate the seat. Further, the manner for extending the seat belt in this application is both novel and improved.

DESCRIPTION OF DRAWINGS

The description refers to the accompanying drawings in which like reference characters refer to like parts in both views and in which:

FIG. 3 perspective view of bench rest bracket.
FIG. 4 perspective view of seat belt extension bracket.
FIG. 5 perspective view of the seat lock assembly.

DESCRIPTION OF PREFERRED EMBODIMENT

Figure 1:
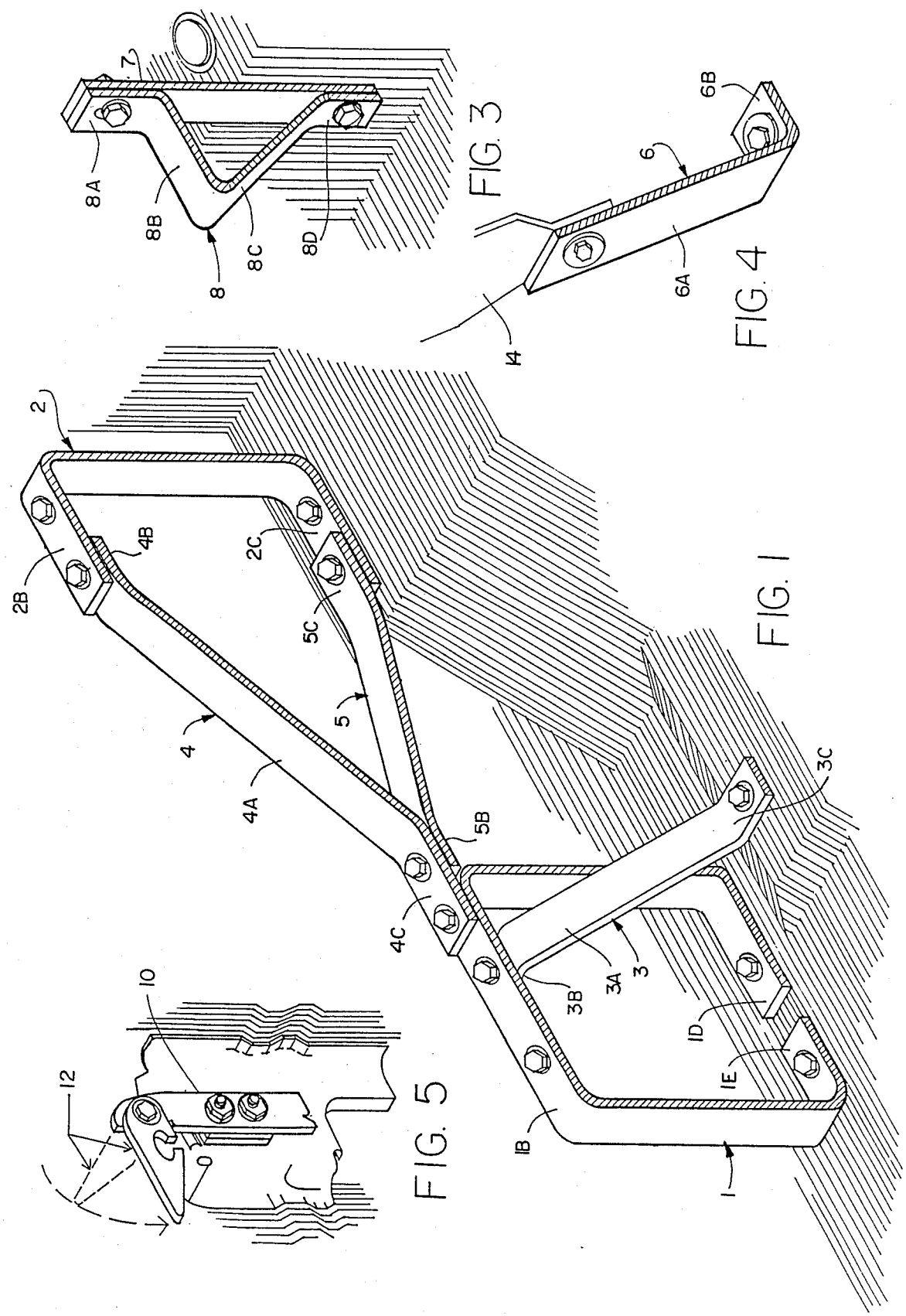
FIG. 1 perspective view of the bottom seat assembly.

As shown in the drawings, the kit for elevating the rear seat in a Super Cab truck includes a rear seat assembly (elements 1–5), a bench rest assembly (elements 7 and 8), a seat belt extension (element 6), and seat lock assembly (elements 9A–C and 10–12).

The rear seat assembly includes a bottom seat bracket 1, a back seat bracket 2, a side brace bracket 3, a back seat brace 4, and a back seat stabilizer 5.

Figure 2:
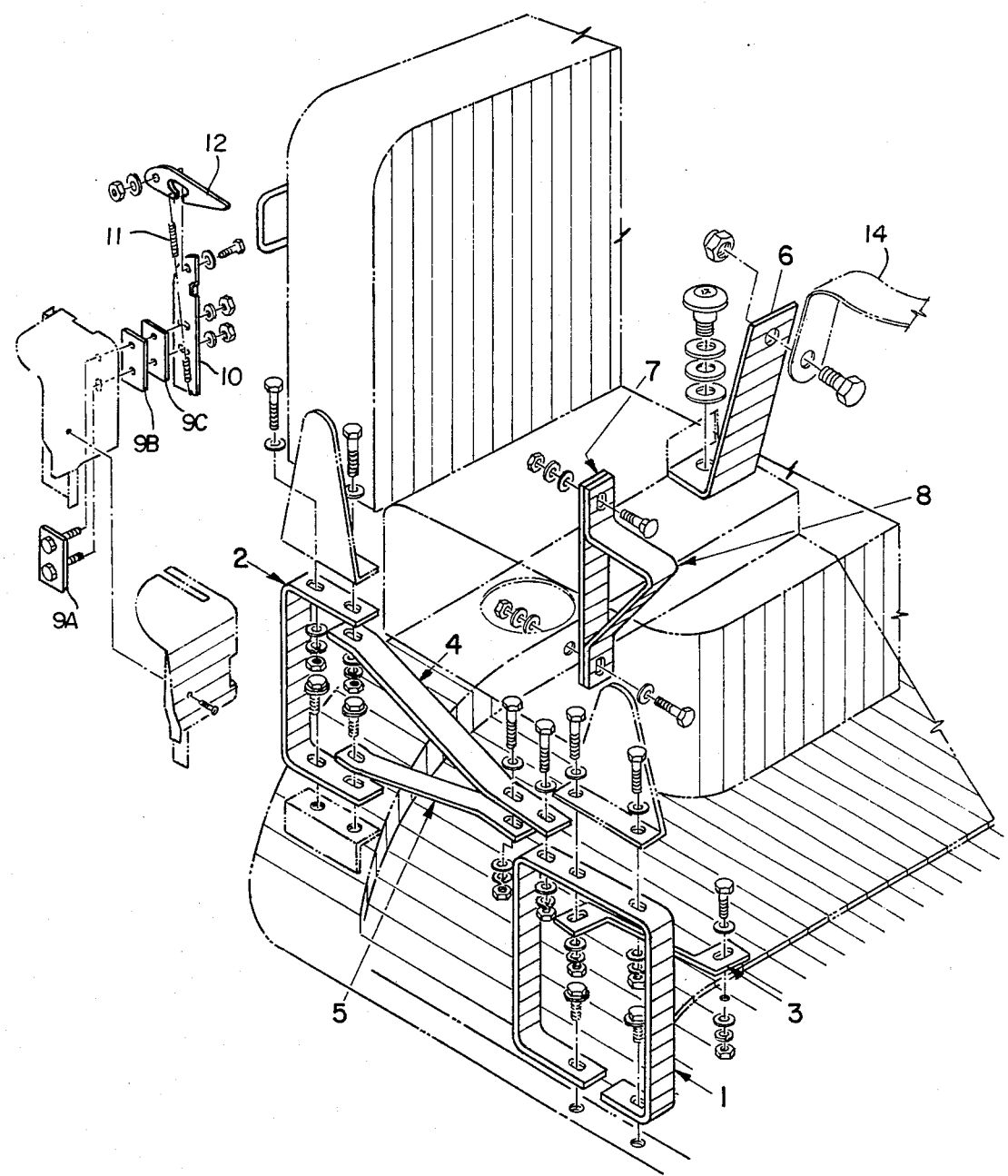
FIG. 2 exploded perspective view of all the assembly.

The bottom seat bracket 1 is shaped to have four sides, separated by bends, with the bottom side having a gap forming two free end members 1D and 1E, each having bolt holes for attaching the bracket 1 to the cab floor. Side 1B of bracket 1 has bolt hole for attaching bracket 1 to brackets 3 and 4 and for attaching bracket 1 to the seat bottom (FIG. 2).

The side brace bracket has a central member 3A and two end members 3B and 3C, separated by bends, each end member extending in the opposite direction. End member 3B has a bolt hole for bolting bracket 3 to side 1B of bracket 1. End member 3C has a bolt hole for attaching the brace bracket 3 to the floor of the truck.

The back seat bracket 2 is C-shaped and has a central member 2A interconnected by bends to two end members 2B and 2C. The end members 2B and 2C extend in the same direction. End member 2C has a bolt hole for bolting to the truck floor. End member 2B has a bolt hole for bolting to the seat back and a bolt hole for bolting to brace 4.

Back seat brace 4 has a central portion 4A separated from two end portions 4B and 4C by bends, such that the end portions extend generally in opposite directions. End portion 4B has a bolt hole for bolting it to end member 2B of the back seat bracket 2. End portion 4C has a bolt hole for bolting it to the bottom seat bracket 1 and a bolt hole for bolting it to the back seat stabilizer.

The back seat stabilizer 5 consists of a central portion 5A and two oppositely extending portions 5B and 5C, all interconnected by bends. Portion 5C has a bolt hole for connecting it to end member 2C of the back seat bracket and to the floor of the truck. Portion 5B has a bolt hole for bolting it to the end portion 4C of the back seat brace 4.

To provide extension for the existing seat belt 14, the seat belt extension bracket 6 consists of portion 6A and portion 6B. Portion 6A has a bolt hole therein for bolting it to the seat belt. Portion 6B has a bolt hole for bolting it to the truck floor.

The bench rest bracket assembly includes a vertical bar bracket 7 and bench rest bracket 8. Bracket 7 includes a bolt hole at each end thereof. Bracket 8 includes four portions. Portions 8A and 8D are the end portions which have bolt holes overlying the bolt holes in bracket 7. In between portions 8A and 8D are portions 8B and 8C which are angled to each other and to the end portions to form a triangular space with bracket 7. Each of portions 8A and 8D are bolted to the corresponding end of bracket 7. In addition, portion 8D and the corresponding end of bracket 7 are bolted to the truck floor.

The seat lock assembly is comprised of a spacer plates 9A, 9B and 9C, a seat lock stand 10, lock spring 11 and seal lock arm 12. The plate 9A has two bolts connected to its center and is used with the bolts to connect the lock assembly to the truck. Plates 9B and 9C serve to space the lock stand 10 on the bolts. The lock stand includes, in addition to the bolt holes which correspond to the bolts on plate 9A, a bolt hole for bolting the lock are thereto. At the bottom of the lock stand is a notch for receiving one end of spring 11. The other end of the spring 11 is attached to the locking arm 12.

I claim:

1. A kit for elevating one end of a rear seat in a Ford truck in which the rear seat includes a seat bottom and a seat back, and in which the cab of the truck includes a cab floor, said kit comprising a bottom seat bracket shaped to have four sides with bends therebetween, one of said sides having a gap to form free members, a first attachment means for attaching free members to the cab floor, another of said sides being opposite and based from said one side; a side brace bracket having a central member and two end members with bends between central member and each of said two end members, said end members facing in opposite directions, second attaching means for attaching one of said end members to the cab floor, third attaching means for attaching the other of said end members to said another side of said bottom seat bracket; a C-shaped back seat bracket having an intermediate member and two connecting end members with bends therebetween, said connecting end members generally facing in same direction, one of said connecting end members having attachment means for attaching said one connecting end member to the cab floor, the other connecting end member for being spaced from said cab floor, said intermediate member for extending in a upright orientation; a back seat brace sized for extending between said another side of said bottom seat bracket and said other connecting end member of said back seat bracket, said back seat brace having first and second free end members, means for connecting said first end members to said another side of said bottom seat bracket, means for connecting said second free end member to said other connecting end member of said C-shaped back seat bracket; a back seat stabilizer sized to extend between said one connecting end member of said C-shaped back seat bracket and said first free end member of said back seat brace, said back seat stabilizer having first and second attaching end members, means for attaching said first attaching end member to said one connecting end member of said C-shaped back seat bracket, means for attaching said second attaching end member to said first free end member of said back seat brace, whereby said bottom seat bracket constitutes means for elevating the seat bottom of said cab seat and whereby said back seat bracket constitutes means for elevating the seat back of the cab seat.

2. A kit as set forth in claim 1, in combination with means for elevating a rear intermediate part of said seat bottom.

3. The kit as set forth in claim 2, in combination with a means for elevating an end of said rear seat opposite said one end.

4. A kit as set forth in claim 3, in combination with a means for elevating seat belts to be used with said rear seat.

5. The kit of claim 4, in combination with a means to lock the seat back in a upright orientation once the rear seat is elevated.

6. A method of installing the kit as set forth in claim 1, in combination with providing means for elevating the rear intermediate part of said seat bottom.

7. A method for installing a kit for elevating one end of a rear seat in a Super Cab truck in which said rear seat includes a seat bottom and a seat back and in which the cab of the truck attaches to the cab floor, including the steps of providing a bottom seat bracket shaped to have four sides with bends therebetween wherein one of said sides has a gap forming free members and wherein there is another side opposite and spaced from said one side, providing a side brace bracket having a central member and two end members with bends between said central member and each of said two end members wherein the two end members extend in opposite directions, attaching one of said end members to the cab floor, attaching the other of said end members to said another side of said bottom seat bracket, providing a C-shaped back seat bracket having as intermediate member and two connecting end members with bends therebetween wherein said connecting end members generally face in the same direction, attaching one of said connecting end members to the cab floor wherein the other connecting end member is spaced from the floor and wherein the intermediate member extends in an upright orientation, providing a back seat brace extending between said another side of said bottom seat bracket and said other connecting end member of said C-shaped back seat bracket, said back seat brace having first and second free end members, connecting the first free end member to said another side, connecting said second free end member to said other of said connecting end members, providing a back seat stabilizer extending between said one connecting end member of said C-Shaped back seat bracket and said first free end member of said back seat brace, said back seat stabilizer having first and second attaching end members, attaching said first attaching end member to said one connecting end member, attaching said second attaching end member to said first free end member.

8. The method of installing the kit, as set forth in claim 7, further including the step of assembling a lock mechanism to provide safe securement of the seat back to the truck interior.

* * * * *